Aug. 29, 1967 B. FIORINO 3,339,157

PHASE LOCKING START CIRCUIT FOR A VARIABLE FREQUENCY OSCILLATOR

Filed July 26, 1966

INVENTOR.
BENJAMIN C. FIORINO

BY Sughrue, Rothwell, Mion, Zinn & Macpeak

ATTORNEYS.

United States Patent Office 3,339,157

Patented Aug. 29, 1967

3,339,157

PHASE LOCKING START CIRCUIT FOR A VARIABLE FREQUENCY OSCILLATOR

Benjamin Fiorino, Poughkeepsie, N.Y., assignor to International Business Machines Corporation, Armonk, N.Y., a corporation of New York Filed July 26, 1966, Ser. No. 567,892
8 Claims. (Cl. 331—172)

Figure 1:
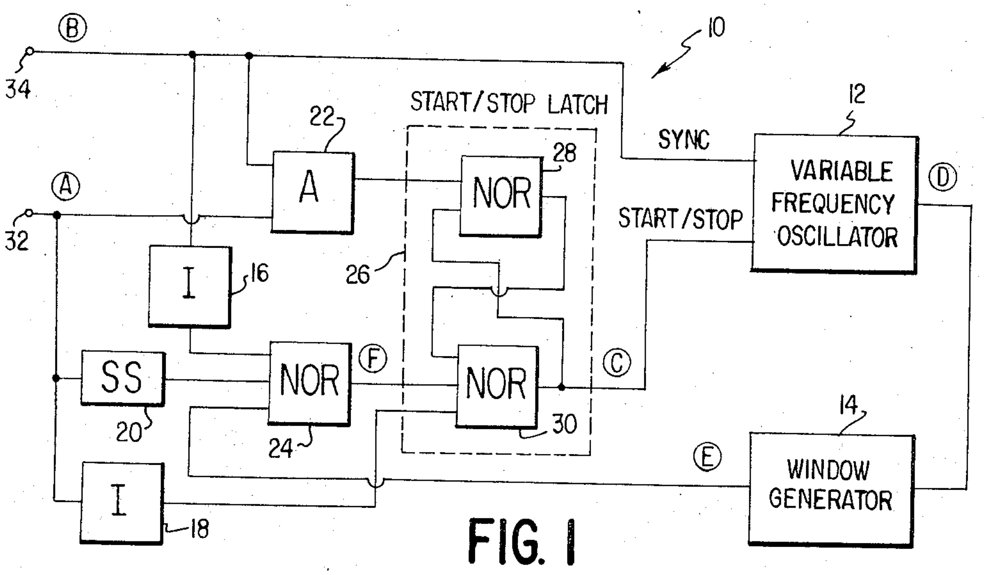

This invention relates in general to an oscillator synchronizing circuit. and more particularly to a novel starting circuit for implementing phase locking in a variable frequency oscillator with respect to an incoming pulse signal.

Data storage systems involving digital encoding require timing or clocking signals to implement readout and detection. These clocking signals are employed to establish the limits of or to frame the time periods during which data bits may occur. When reading out information stored on magnetic tapes, for example, the bit rate varies widely depending upon such variables as the recording or writing density, the tape speed, etc., and it has therefore become common practice to employ variable frequency oscillators synchronized with the incoming data bits as a source of clocking signals. A problem attendant with the use of such variable frequency oscillators is initially synchronizing them with, or matching their frequencies to, the data signals during the start-up or beginning of record periods.

In one prior art solution of this problem, as disclosed in U.S. Patent No. 3,156,875, a switching transistor at the input of a variable frequency sawtooth generator grounds the charging capacitor in its normally on condition. A starting signal turns this transistor off and permits the generator to begin operation with the proper initial phase relationshp between the generator signal and the data signal, this being when the data signal occurs in the middle of the positive excursion of the sawtooth waveform. This technique is not completely satisfactory, however, for large differences between the generator start frequency and the data bit frequency. Under these conditions, a critical situation with respect to maintaining synchronism may evolve wherein the data pulse occurs at or near the fly-back time of the sawtooth waveform.

It is therefore a primary object of this invention to provide a start circuit for a variable frequency oscillator which insures positive initial synchronization even in the face of relatively large frequency differences between the oscillator and the data or synchronizing signal.

It is a further object of this invention to provide such a circuit which implements initial synchronization without increasing the overall closed loop gain of the oscillator, thereby avoiding the use of power level circuitry.

It is a further object of this invention to provide such a circuit which employs a logic gate network to sample the data signal during a predetermined interval from shortly before to shortly after the oscillator fly-back time, to thereby detect the critical condition.

It is a further object of this invention to provide such a circuit which responds to the critical condition by shutting the oscillator off and restarting it in precise initial synchronization with the data signal, the action being repeated as often as necessary until running synchronism or lock-in is achieved.

Figure 2:
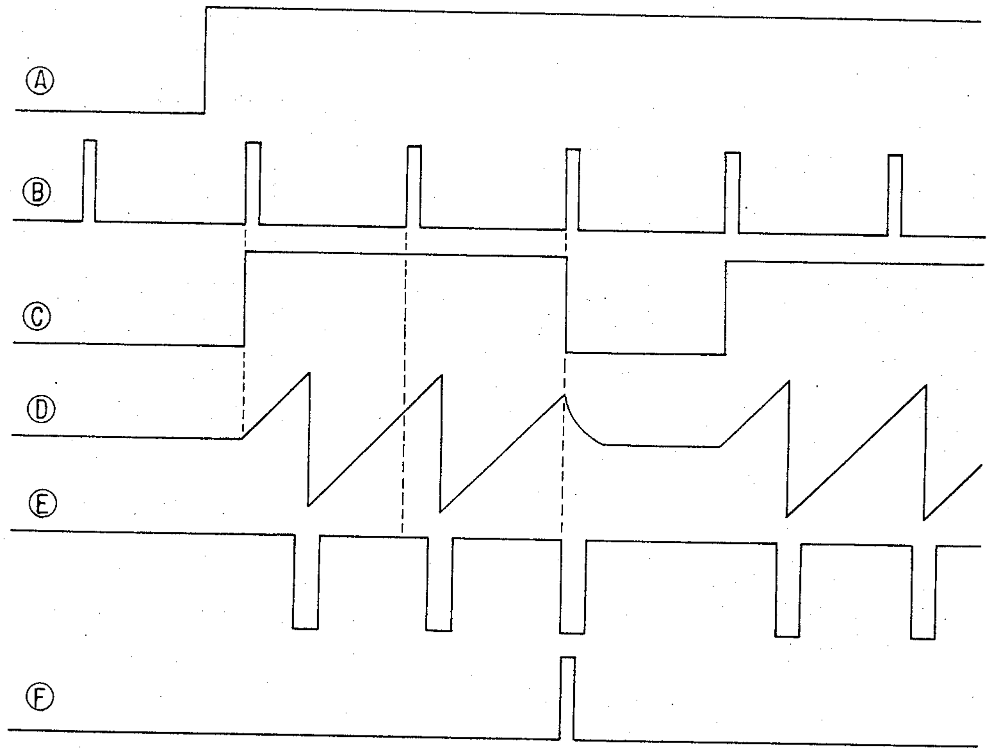

The foregoing and other objects, features and advantages of the invention will be apparent from the following more particular description of a preferred embodiment of the invention, as illustrated in the accompanying drawings, in which:

FIGURE 1 shows a block diagram of an oscillator start circuit constructed in accordance with the teachings of this invention, and FIGURE 2 shows a timing chart of the waveforms occurring at various points in the circuit of FIGURE 1.

Referring now to the drawings, the start circuit 10 of this invention for the variable frequency oscillator 12 includes a window generator 14, Inverters 16 and 18, a Single Shot 20, an AND gate 22, a NOR gate 24, and a Latch 26 comprising a pair of cross-coupled NOR gates 28 and 30. These components will not be described in detail since they are all well known to those skilled in the electronics art and constitute no part of the invention. Initially the oscillator 12 is held off by waveform C of FIGURE 2 being down, which results from the down portion of waveform A being rendered up by Inverter 18 and applied to NOR gate 30, causing its output to be down.

When waveform A of FIGURE 2 at terminal 32 goes up, to signal the beginning of a record, it conditions AND gate 22, triggers Single Shot 20 and holds it in its triggered or on condition, causing its normally up output to go down, and is transformed to a down signal by Inverter 18. The record format also includes an initial burst of zeros for synchronization purposes, as represented by waveform B of FIGURE 2, and the first such pulse arriving at terminal 34 after the raising of waveform A triggers AND gate 22. The output from this AND gate is applied to NOR gate 28 in the start/stop Latch 26. This drops the output of NOR gate 28 which is cross-coupled to the input of NOR gate 30 in the latch. NOR gate 30 also sees down signals from Inverter 18 and NOR gate 24, and its output therefore goes up, as shown by waveform C, to start the oscillator 12 and maintain the Latch 26 in its up or set condition.

The oscillator 12 produces the sawtooth waveform D of FIGURE 2 starting at zero and having equal positive and negative excursions. Since the oscillator is triggered by a data pulse and starts at the midpoint of its positive excursion, the oscillator signal thus has the desired initial phase relationship with respect to the data signal. The output from the oscillator is applied to the window generator 14 which produces the negative sampling or gating pulse waveform E shown in FIGURE 2. These pulses have a width of approximately 25% of the oscillator period and are centered at the fly-back intervals. Waveform E is applied to NOR gate 24, and since the output from Single Shot 20 is down at this point, the pulses of waveform E thus create "windows" centered around the critical fly-back times through which the incoming data bits may be "observed" at NOR gate 24 to determine whether or not a critical synchronization situation exists.

Assuming that the data bit frequency is 20% lower than the oscillator starting frequency, which is the case illustrated in FIGURE 2, the first data pulse after the oscillator starts up will occur when the sawtooth is three-fourths of the way to its positive peak. This is slightly before a sampling pulse in waveform E, and therefore NOR gate 24 will always see at least one up input and its output will remain down. The second data pulse after oscillator start up occurs precisely at fly-back time, however, and since the up data pulses are transformed down by Inverter 16, NOR gate 24 now sees all down inputs and its output therefore goes up, as shown by waveform F in FIGURE 2. This resets the latch 26 by causing the output from NOR gate 30 to go down, which in turn stops the oscillator 12 to terminate the critical synchronization conditions. Once the data pulse that initiated the oscillator stopping drops, the output from Inverter 16 goes up again, the output from NOR gate 24 goes down, and the oscillator is conditioned for restarting.

The next data pulse, i.e. the fifth one in waveform B, once again triggers AND gate 22 which sets Latch 26 as before and restarts the oscillator. The same sampling sequence is then repeated around each fly-back period, with attendant oscillator stopping and restarting when a critical situation occurs, until the data pulses are applied to the sync input of the oscillator alters its frequency and locks it to that of the data signal.

It will thus be seen that the novel oscillator start circuit of this invention utilizes a sampling technique to detect the occurrence of a data pulse within a certain time interval surrounding the fly-back period of the oscillator signal, and in response thereto stops the oscillator and later restarts it with the desired phase relationship.

While the invention has been particularly shown and described with reference to a preferred embodiment thereof, it will be understood by those skilled in the art that various changes in form and details may be made therein without departing from the spirit and scope of the invention.

What is claimed is:

1. A phase locking start circuit for a variable frequency oscillator having an output waveform characterized by abrupt periodic amplitude transitions, comprising:

(a) a source of synchronizing pulses for the oscillator, (b) means responsive to a synchronizing pulse for starting the oscillator at a point midway between the periodic transitions, (c) means responsive to the output waveform of the oscillator for producing pulses centered at the periodic transitions, (d) means for detecting coincidence between the produced pulses and the synchronizing pulses, and (e) means responsive to the detecting means for stopping the oscillator, whereby the means responsive to a synchronizing pulse subsequently restarts the oscillator at a point midway between the periodic transitions.

2. A phase locking start circuit as defined in claim 1 wherein the means for producing pulses is a window generator and the pulse widths extend between predetermined limits before and after the transitions.

3. A phase locking start circuit as defined in claim 1 wherein the means for stopping and the means for starting includes a bistable latch set in response to the synchronizing pulses and reset in response to the detecting means.

4. A phase locking start circuit as defined in claim 1 wherein the means for detecting is a NOR gate, the produced pulses are negative, and further including means for inverting the synchronizing pulses and applying them to the NOR gate.

5. A phase locking start circuit as defined in claim 4 wherein the means for stopping and the means for starting includes a bistable latch comprising a pair of cross-coupled NOR gates set in response to the synchronizing pulses and reset in response to the NOR gate of the detecting means.

6. A phase locking start circuit as defined in claim 3 wherein the means for producing pulses is a window generator and the pulse widths extend between predetermined limits before and after the transitions.

7. A phase locking start circuit as defined in claim 1 further including signal responsive means for gating the synchronizing pulses to the means for starting, for enabling the detecting means, and for unlocking the means for stopping and the means for starting.

8. A phase locking start circuit as defined in claim 7 wherein the means for stopping and the means for starting includes a bistable latch set in response to the synchronizing pulses and reset in response to the detecting means.

No references cited.

ROY LAKE, *Primary Examiner.*

J. KOMINSKI, *Examiner.*